(12) United States Patent
Davidson et al.

(10) Patent No.: US 7,713,020 B2
(45) Date of Patent: May 11, 2010

(54) EXTRACTING ENERGY FROM FLOWING FLUIDS

(76) Inventors: Aaron Davidson, 172 Townson Avenue, Palm Beach, Gold Coast (AU) 4221; Craig Colin Hill, 7 View Court, Palm Beach, Gold Coast (AU) 4218

( * ) Notice: Subject to any disclaimer, the term of this patent is extended or adjusted under 35 U.S.C. 154(b) by 1085 days.

(21) Appl. No.: 10/564,490

(22) PCT Filed: Jul. 12, 2004

(86) PCT No.: PCT/AU2004/000937
§ 371 (c)(1),
(2), (4) Date: Jan. 11, 2006

(87) PCT Pub. No.: WO2005/005820
PCT Pub. Date: Jan. 20, 2005

(65) Prior Publication Data
US 2006/0212845 A1    Sep. 21, 2006

(51) Int. Cl.
*F04D 27/02* (2006.01)
(52) U.S. Cl. .............................. 415/1; 415/4.2; 415/4.4; 415/126; 415/211.2; 415/907

(58) Field of Classification Search ................. 415/1, 415/4.2, 4.4, 126, 211.2, 224, 907; 416/111, 416/156; 290/43, 54; 239/589, 592, 593, 239/594, 595
See application file for complete search history.

(56) References Cited

U.S. PATENT DOCUMENTS

| 4,491 | A | * | 5/1846 | Judd ...................... 415/149.1 |
| 353,363 | A | * | 11/1886 | Ludwig .................. 415/122.1 |
| 4,219,303 | A | * | 8/1980 | Mouton et al. ................ 415/7 |
| 5,464,320 | A |   | 11/1995 | Finney |
| 2003/0133782 | A1 | * | 7/2003 | Holter et al. ................ 415/4.2 |

FOREIGN PATENT DOCUMENTS

RU          2049263       11/1995

* cited by examiner

*Primary Examiner*—Edward Look
*Assistant Examiner*—Aaron R Eastman
(74) *Attorney, Agent, or Firm*—Shoemaker and Mattare

(57) ABSTRACT

A method and apparatus (10) for extracting energy from flowing fluids using a diffuser (11) which has side walls (14) formed from a series of aerofoil section members (15) with gaps (29) provided between the leading and trailing ends of the members (15) to allow introduction of fluid from outside of the diffuser (11) into the diffuser flow passage (16) such that increased energy can be extracted from the flowing fluid by a prime mover (20) located in the flow passage (16).

22 Claims, 6 Drawing Sheets

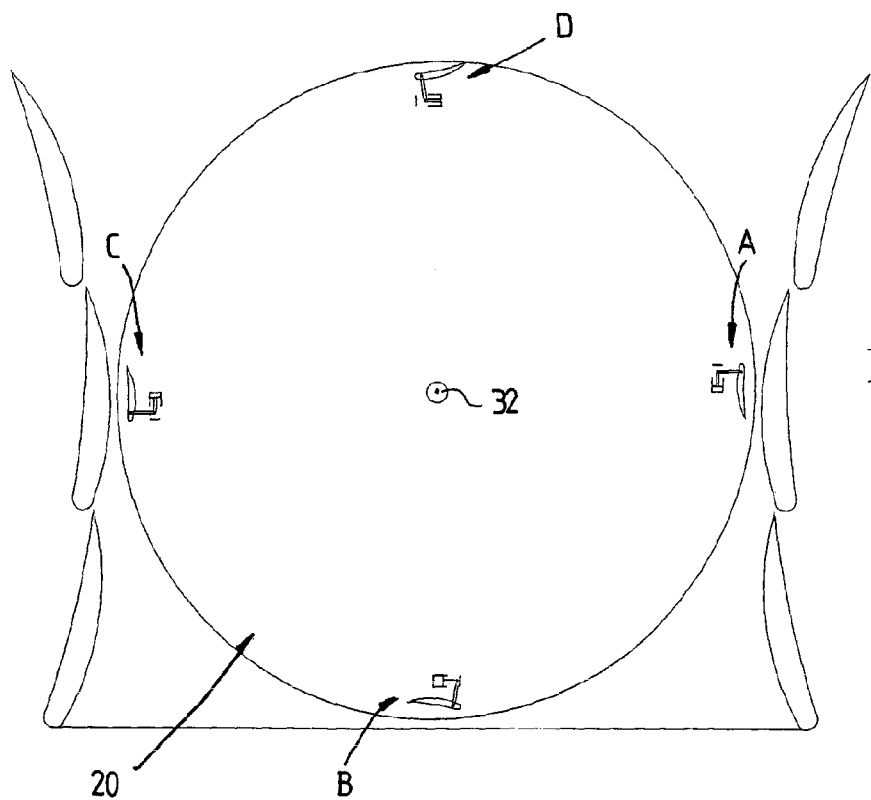
FIG. 3
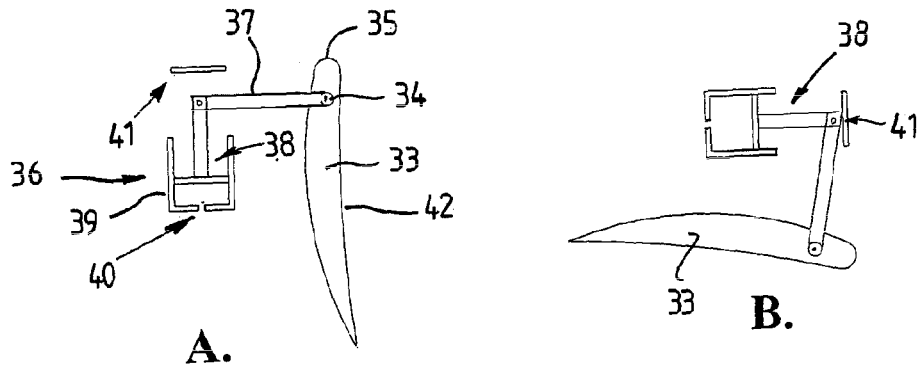
FIG. 4
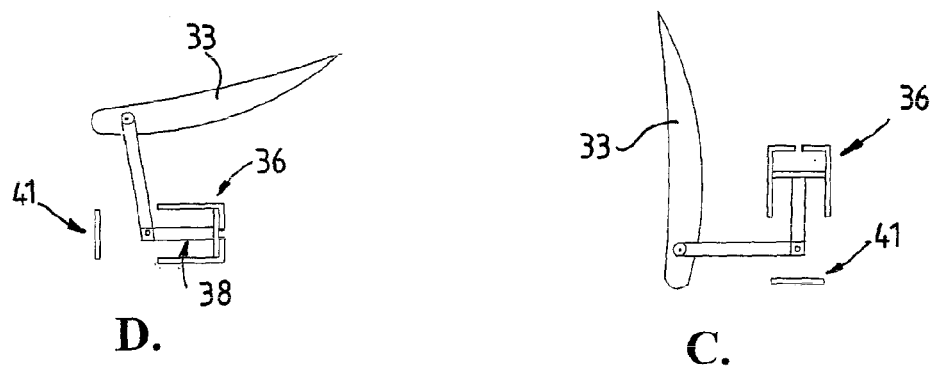

EXTRACTING ENERGY FROM FLOWING FLUIDS

TECHNICAL FIELD

This invention relates a method and apparatus for extracting energy from flowing fluids and in particular to an improved method and apparatus for increasing the efficiency of extraction of energy from flowing liquids.

BACKGROUND ART

It is well known to extract energy from a flowing fluid by the use of suitable turbines which drive electrical generators to generate electricity. Such arrangements are commonly used in hydroelectric systems and usually use a head of water created through the construction of a dam to create a flow of water through conduits in which turbines are positioned. These systems whilst relatively efficient can negatively impact the environment during and following construction of the dams.

Other systems have been proposed and used which use the sea as a source of energy. Energy can be extracted from the sea by using the wave motion of the sea or tidal movement of the sea. A slow moving body of fluid however requires a large and costly prime mover to generate the necessary motion to drive energy extraction means. While the body of fluid may well be capable of providing substantial energy, it is the harnessing of that energy which is difficult. In order to generate an adequate supply of electricity to render a system profitable, a velocity of fluid flow should be high enough to avoid the necessity of providing costly and complicated prime movers. The costs of systems currently proposed or in use are too high to justify their broad implementation. In the various systems which are presently used, it is difficult to obtain a sufficiently high fluid velocity to enable efficient extraction of energy.

SUMMARY OF THE INVENTION

The present invention aims to provide an improved method and apparatus for extracting energy from flowing fluid which overcomes or at least alleviates one or more of the above disadvantages. In a particular aspect the present invention aims to provide a diffuser for use in enhancing energy collection from a flow of fluid such as water in a tidal energy extraction system. The present invention in a further aspect aims to provide apparatus for extracting energy from a flow of fluid. Other objects and advantages of the invention will become apparent from the following description.

According to one aspect of the present invention, there is provided a diffuser for use in apparatus for extracting energy from a flow of liquid, said diffuser comprising a flow passage having an inlet and an outlet and a side wall or walls between said inlet and said outlet, said side wall or walls being defined by a plurality of members of an aerofoil cross section.

Preferably the aerofoil section members are arranged in series between the inlet and outlet such that other than at the inlet and outlet, the trailing portion or edge of one aerofoil section member is adjacent the leading portion or edge of the immediately adjacent trailing aerofoil section member. The term "aerofoil section member" as used herein includes any wing-like body.

Preferably, a gap or slot is provided between a trailing portion or edge of each aerofoil section member and the leading portion or edge of the adjacent aerofoil section member section so that high energy flow from outside of the diffuser can be introduced into the flow passage between the respective aerofoil section members.

Typically, the diffuser may be positioned in a naturally occurring flow of fluid such as within a tidal flow such that the inlet is positioned upstream of the outlet. The diffuser may be supported on a suitable support means positioned in the flow of fluid. Preferably the diffuser is mounted rotatably to the support means so as to adjust to the direction of the flow of fluid. The support means may comprise a support pedestal to which the diffuser is mounted for rotation about a vertical axis. Alternatively, the diffuser may be suspended from a suitable structure or other means such as a buoyant body or anchored at a required elevation within the body of fluid.

The diffuser suitably defines a flow passage which initially decreases in cross sectional area from the inlet to a constricted region between the inlet and the outlet and, thereafter, has an increasing cross sectional area rearwardly and away from the constricted region towards the outlet. Preferably the aerofoil section members are arranged along a parabolic curve between the inlet and outlet.

The diffuser in one form may define a flow passage which is of a substantially rectangular cross section. The diffuser in this configuration suitably has a pair of opposite spaced apart planar walls and a pair of opposite walls defined by the aerofoil section members. Suitably the spaced apart planar walls comprise upper and lower walls and the aerofoil section members suitably comprise members which are oriented such that the leading and trailing edges of the aerofoil section members are substantially vertical and extend between the upper and lower walls of the diffuser.

The diffuser however may define a flow passage of any cross section. Thus in a further form the diffuser may define a flow passage which is substantially circular in cross section with the side walls of the diffuser being defined by annular members of aerofoil cross section. In yet a further configuration, the diffuser may define a flow passage of multi-sided cross section such as of an octagonal cross section. In such a configuration, the side walls of the flow passage may be defined by a plurality of sets of linear aerofoil section members which in each set are angled to each other with the plurality of sets arranged one after the other between the inlet and outlet.

The aerofoil section members in the diffuser from the constriction rearwardly are angled at an increasing angle to the longitudinal axis of the diffuser with respective openings or gaps formed between the trailing edge of one member and the leading edge of the adjacent trailing member. In a typical configuration, the diffuser has aerofoil section members which rearwardly of the constricted region are angled at 10 to 20 degree increments relative to the longitudinal axis of the diffuser.

At the leading end of the diffuser, the aerofoil section members of the side walls are preferably angled outwardly from the constriction to provide an angle of incidence suitably at 10 to 12 degrees to the longitudinal axis of the diffuser. Further, the aerofoil section members at or adjacent the constricted region suitably extend substantially parallel to the longitudinal axis of the diffuser. Suitably at the trailing end of the diffuser, the aerofoil section members are angled outwardly at 40 to 45 degrees to the longitudinal axis of the diffuser. Reference to angles of the aerofoil section members herein is a reference to angles taken from the chord lines of the aerofoil section members.

Preferably the aerofoil section members comprise asymmetric aerofoil section members. Preferably the asymmetric aerofoil section members have their camber arranged on the flow passage side of the diffuser.

Preferably means are provided to adjust the aerofoil section members to adjust the gap between the aerofoil section members. Preferably for this purpose, the aerofoil section members are mounted for pivotal movement about their longitudinal axes and means are provided to adjust the pivotal position of the members.

When applied to use in energy collection apparatus for extracting energy from a flowing liquid, the diffuser is typically positioned in a naturally occurring flow of water and a prime mover is positioned in or near the constriction. Preferably means are provided to sense the output of the prime mover and means are provided to adjust the aerofoil section members for example by pivoting the aerofoil section members about their pivot axes to adjust the size of the gaps or slots between the aerofoil section members in accordance with the sensed output such that the aerofoil section members can be moved to an optimum position where maximum output of the prime mover is achieved. Preferably flow sensing means are provided to sense the velocity of flow of fluid in the flow passage and the optimum position of the aerofoil section members to provide maximum output from the prime mover can be calibrated in accordance with the velocity of the flow of fluid through the flow passage.

The present invention in a further aspect thus provides a method of generating energy, the method comprising the steps of providing a diffuser in a naturally occurring fluid flow, said diffuser comprising a flow passage having an inlet and an outlet and a side wall or walls between said inlet and said outlet, said side wall or walls being defined by a plurality of members of an aerofoil cross section and said flow passage having a constricted region between said inlet and said outlet, and driving an energy take-off means with a prime mover positioned in the constricted region, the prime mover being configured to move in response to the flow of fluid through the constricted region.

In yet a further aspect, the present invention provides an apparatus for generating energy, the apparatus comprising a diffuser comprising a flow passage having an inlet and an outlet and a side wall or walls between said inlet and said outlet, said side wall or walls being defined by a plurality of members of an aerofoil cross section, said flow passage baying a constricted region between said inlet and outlet and a prime mover positioned in the constricted region to drive an energy take-off means, the prime mover being configured to move in response to the flow of fluid through the constricted region.

Suitably the aerofoil section members are arranged in series between the inlet and outlet such that other than at the inlet and outlet, the trailing portion or edge of one aerofoil section member is adjacent the leading portion or edge of the immediately adjacent trailing aerofoil section member and a gap or slot is provided between a trailing portion or edge of each aerofoil section member and the leading portion or edge of the adjacent profiled section (apart from at the aerofoil section members at the leading and trailing end of the diffuser). The gaps or slots between the respective aerofoil section members allow the introduction of high energy fluid flow from outside of the diffuser into the flow passage whereby boundary layer separation is prevented so that the diffuser recovers some of the velocity head, thereby increasing the pressure drop across the prime mover and hence power output. As referred to above, the size of the gaps can be adjusted in accordance with the output of the prime mover so that the optimum position of the members can be set. Each aerofoil section member may be adjusted separately or all the aerofoil section member may be adjusted to the same extent. Preferably the aerofoil section members are mounted for pivotal movement about their longitudinal axes and means may be provided for selectively pivoting the aerofoil section members about their pivot axes. The adjusting means may be controlled by a programmable microcontroller to enable individual aerofoil section members to be pivoted about their axes either simultaneously to the same extent or separately. Thus the gaps or slots between respective adjacent aerofoil section members may be adjusted to the same extent or to a different extent. The velocity of the flow of fluid in the flow passage may also be monitored by the microcontroller such that the optimum position of the aerofoil section members can be set in accordance with the velocity of flow to provide optimum output from the prime mover.

The prime mover is configured to be acted upon by the water passing through the diffuser to rotate at a speed proportional to the velocity of the water in the constriction. Typically, the prime mover is in the form of a turbine which is rotatably mounted within the flow passage. Suitably, the turbine has a rotatably mounted shaft and blades which are supported on or to the shaft. The blade may be positioned and configured so that the shaft is rotated when fluid passes through the passage. The blades may be spaced radially from, and extend parallel to, the shaft or axis of rotation of the turbine. Suitably the blades are of an aerofoil cross section. The shaft and the blades may be positioned orthogonally with respect to a direction of flow through the conduit means. Thus, an axis of rotation of the shaft and the blades may be orthogonal with respect to the direction of flow.

Each blade may be adjustably mounted so that the blades can be adjusted to produce maximum response to the flow of fluid through the flow passage. The blades of the turbine are suitably mounted so as to be capable of limited pivotal movement about their longitudinal axes. Damping means are suitably provided to damp the pivoting movement of the blades. Preferably an arm is fixed to each blade for pivotal movement therewith, the arm being associated with the damping means. The damping means suitably comprises hydraulic damping means. The damping means preferably damp pivotal movement of the blades in opposite directions. The damping means may comprise a piston and cylinder associated with each blade. The cylinder of the damping means may include an opening to allow limited flow of fluid to and from the cylinder upon movement of the piston therein in opposite directions. Preferably the arms of the blades are pivotally connected to the respective pistons of the hydraulic damping means.

Stop means may also be provided to limit the pivotal movement of the blades. The stop means may be provided in the path of movement of the arms to limit pivotal movement of the arms and thus blades in a first direction. The damping means may comprise the means to limit the pivotal movement of the arms and blades in the opposite directions.

The turbine can be mounted either in a vertical orientation or alternatively, can be mounted horizontally, depending on location and constructional requirements. Thus the blades and the shaft may be substantially vertically oriented when the diffuser is in an operative position. Alternatively, the blades and the shaft may be substantially horizontally oriented when the diffuser in an operative position.

The apparatus may include an energy take-off means that is connected directly or indirectly to the shaft of the turbine. The energy take-off means may include an electrical generator for generating electricity. The shaft may extend through a side wall or wall of the diffuser to be coupled if desired through suitable gearing or a suitable transmission to the electrical generator.

A turbine of cross flow configuration is described above for use in extracting emery from the flow of fluid through the diffuser however the turbine may be in any suitable configuration which will allow energy to be extracted from the accelerated fluid flow through the constricted region. Further, a plurality of prime movers may be mounted within the diffuser and connected to respective energy take off means.

BRIEF DESCRIPTION OF THE DRAWINGS

Reference will now be made to the accompanying drawings which illustrate preferred embodiments of the diffuser and associated turbine. It will be appreciated however that the turbine used to extract energy from flow through the diffuser may be in many different configurations other than that shown and described. Similarly, the illustrated turbine may be used with other forms of diffuser or shroud or in other applications. In the drawings:

FIG. 3 is an enlarged cross section view of the constricted region of the diffuser;

FIGS. 4 (A) to (D) are enlarged views illustrating the blades of the turbine with associated dampers in their different attitudes shown in FIG. 3;

DETAILED DESCRIPTION OF THE PREFERRED EMBODIMENTS

Figure 1:
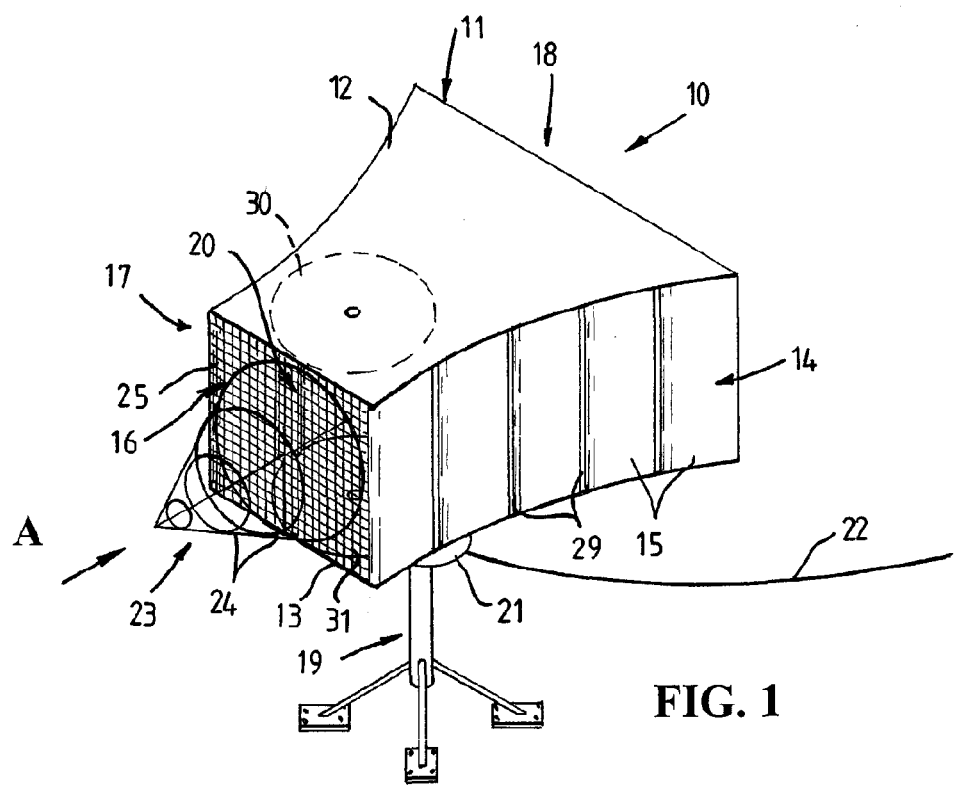
FIG. 1 illustrates a fluid energy extraction apparatus according to one aspect of the invention and positioned in a flow of fluid.

Referring firstly to FIG. 1, there is illustrated fluid energy extraction apparatus 10 according to an embodiment of the invention submerged within a flowing fluid for example within a river, the direction of flow of which is indicated by the arrow A. The apparatus 10 includes a diffuser 11 having top and bottom planar walls 12 and 13 and opposite side walls 14 defined by a plurality of linear aerofoil section members 15 of constant cross section which extend between the top and bottom walls 12 and 13 and which have their leading and trailing edges extending linearly and substantially at right angles to the planar walls 12 and 13. The diffuser 11 thus defines a flow passage 16 of substantially rectangular cross section but which varies in dimensions between a leading inlet 17 and trailing outlet 18 of the diffuser 11.

The diffuser 11 is mounted on a pedestal 19 for rotation about a substantially vertical axis such that the diffuser 11 may automatically adjust to the direction of flow whereby the inlet 17 is always directed towards incoming fluid flow. The pedestal 19 may include legs for mounting the diffuser where required for example to bedrock in a river. Mounted within the diffuser 11 in the flow passage 16 for rotation above a vertical axis is a turbine 20 for extracting energy from fluid flowing through the diffuser. An electric generator 21 mounted to the underside of the diffuser 11 is coupled to the turbine 20 through any suitable transmission such as a gear transmission such that rotation of the turbine 20 causes the generator 21 to be driven. An electrical cable 22 is connected to the generator 21 and leads to any above surface location where power generated by the generator 21 is to be supplied. A deflector 23 is provided at the inlet 17 to prevent debris passing into the diffuser 11 or to deflect debris from the diffuser inlet 17. The deflector 23 includes a plurality of spaced apart circular deflector elements 24 of increasing diameter from the leading end of the deflector 23 towards the inlet 17. A mesh grid 25 is further associated with the deflector 23 to trap debris and prevent debris entering the flow passage 16.

Figure 2:
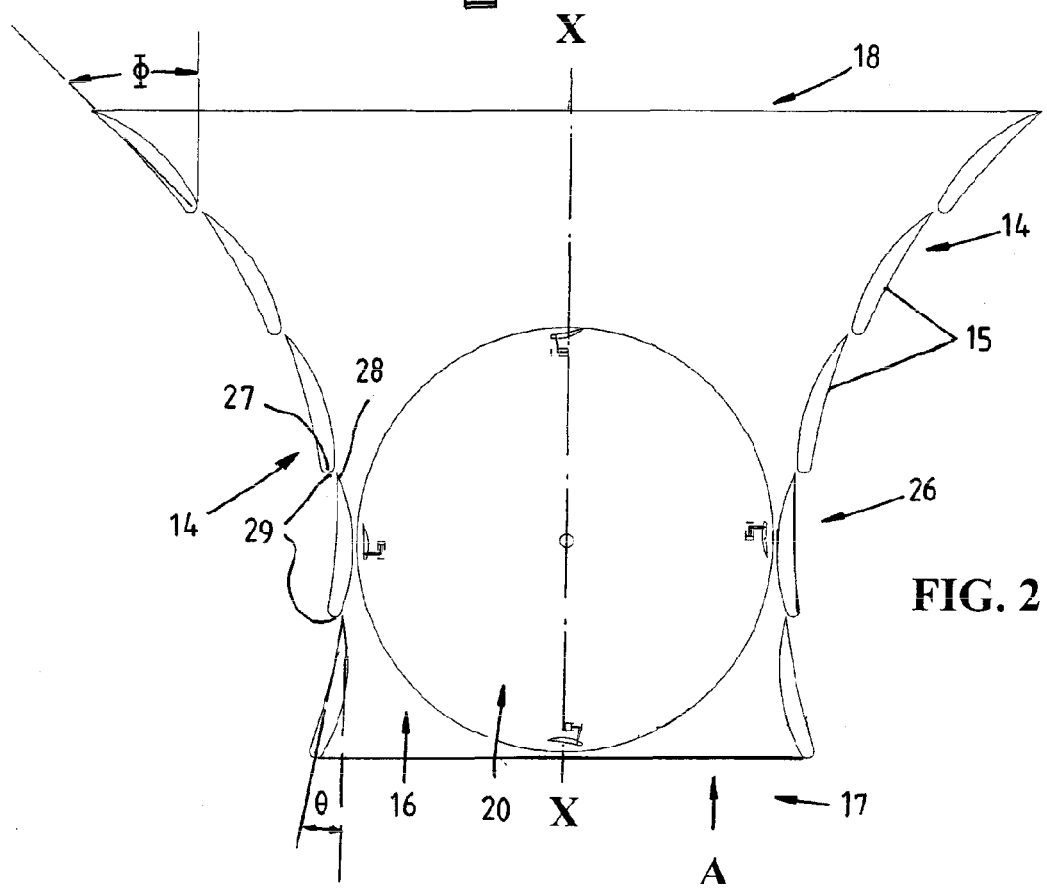
FIG. 2 is a cross sectional view of the diffuser of the apparatus of FIG. 1.

As shown more clearly in FIG. 2, the diffuser 10 has a constriction 26 between the inlet 17 and outlet 18 and adjacent to the inlet 17. The flow passage 16 initially decreases in cross section from the inlet 17 to the constriction 26 and then increases in cross section from the constriction 26 to the outlet 18. The aerofoil section members 15 which form the side walls 14 of the diffuser 11 are oriented such that their leading edges 27 are directed towards the inlet 17 and the trailing edges 28 are directed towards the outlet 18 and are further arranged between the inlet 17 and outlet 18 along a parabolic curve to form the constriction 26. The respective aerofoil section members 15 are further arranged such that gaps 29 of slot-like configuration are provided between the trailing edges 28 of each aerofoil section member 15 and the leading edges 27 of an adjacent trailing member 15 (apart from at the leading and trailing ends of the diffuser 11). The members 15 are further arranged such that the leading edges 27 members 15 are arranged outwardly relative to the flow passage 26 of the trailing edges 28 of the immediately adjacent leading members 15. The gaps 25 enable the introduction into the fluid flow passage 16 of high energy fluid flow from outside the diffuser 11 to prevent boundary layer separation and for the recovery of velocity head.

The geometry of the side walls 14 is such that the aerofoil section members 15 at the inlet are angled outwardly at an angle θ between their chord lines and the longitudinal axis X-X of the diffuser 11 of between 10 and 12 degrees. The included angle between the leading aerofoil section members 15 is thus 20 to 24 degrees. The aerofoil section members 15 at the outlet 17 of the diffuser 11 are angled outwardly at an angle Φ between their chord lines and the longitudinal axis X-X of 40 to 45 degrees. Thus the included angle between these members is 80 to 90 degrees. These angles however may be varied both at the trailing and leading end of the diffuser 11.

At the constriction 26, the chord lines of the aerofoil section members 15 lie substantially parallel to the longitudinal axis X-X of the diffuser 11. Rearwardly from the constriction 26, the aerofoil section members 15 in turn are angled at an increasing angle to the axis X-X of the diffuser 11. Typically the aerofoil section members 15 from the constriction 26 rearwardly are angled outwardly at increments of 10 to 15 degrees. The aerofoil section members 15 have an asymmetrical configuration as illustrated with their camber and thus convex sides located on the flow passage side of the diffuser 11.

The turbine 20 as more clearly shown in FIGS. 3 and 4 comprises a vertical axis turbine having upper and lower discs 30 and 31 mounted to the diffuser 11 for rotation about a vertical axis via a central shaft 32. A plurality of circumferentially spaced vertical linear blades 33, in this case four blades, of asymmetrical aerofoil cross section are supported between and mounted to the upper and lower discs 30 and 31. Each blade 33 of the turbine 20 is mounted to the discs 30 and 31 for limited pivotal movement about an axis 34 extending longitudinally relative to the leading edges 35 of the blades 33. Each blade 33 of the turbine 20 is allowed to pitch to a limited degree in this embodiment + or −10 degrees with pivotal movement of the blades 33 in one direction dampened and limited by means of hydraulic dampeners 36. The pivot axes of the turbine blades 30 is preferably less than 25% of the chord distance from the leading edges of the blades 33. The pitching action of the blades 33 about their pivotal axes 34 is damped by means of the hydraulic dampeners 36 which as described below are open to outside water and prevent the turbine blades 33 from excessive shock during the pitching moment that would otherwise destroy the blades 33 and the turbine 20.

For the above purpose, arms 37 are fixed at one end to the blades 33 at the pivot axes 34 for rotation with the blades 33. At their other ends, the arms 37 are pivotally connected to the pistons 38 of the hydraulic dampeners 36 which are movable within cylinders 39. The cylinders 39 have bleed valves or ports 40 allowing controlled escape of fluid from the cylinders 39 as the pistons 38 advance into the cylinders 39. Pivotal movement of the blades 33 in the opposite direction is also damped by the dampeners 36 as the bleed valves or ports 40 restrict entry of external fluid flow into the cylinders 39. Further, stoppers 41 opposite the dampeners 36 in the path of movement of the pistons 33 and arms 37 limit pivotal movement of the blades 33 in the opposite direction.

The turbine 20 is located on the longitudinal axis X-X of the diffuser 11 in the constriction 26 immediately inside the inlet 16. The turbine blades 33 are positioned with their camber located innermost to provide the most efficient performance. The turbine 20 illustrated has an anti clockwise rotation due to the blade orientation but could be reversed to clockwise by reversing the blades 33. In the embodiment illustrated the turbine 20 has four blades but can have three or more blades 33.

On the compression stroke of the piston 38 as in the position D of FIG. 4, the end of the piston 38 engages the end of the cylinder 39 to prevent the pitch amplitude exceeding 10 degrees. On the suction stroke of the piston 38 which is damped by the bleed valve 40, the stopper 41 prevents the movement exceeding 10 degrees in the opposite direction as in position B of FIG. 4.

In FIG. 3, turbine blades 33 are shown as they pitch through an arc of + and −10 degrees or 20 degrees inclusive. In FIG. 4A, the turbine blade 33 is in a neutral position or pitch. FIG. 4B shows a −10 degree pitch position with the pitch movement controlled by the stopper 41 preventing the piston 38 from further movement. FIG. 4C shows the neutral pitch position opposite the FIG. 4A position. FIG. 4D shows the +10 degree pitch position and the end of the piston 38 cooperating with the dampener cylinder 39 controlling the blade pitch.

The blades 33 as described may be mounted to solid disks 30 and 31 top and bottom so that the disks 30 and 31 and the blades 33 can rotate together. Alternatively the blades 33 can be held and supported by means of radial arms fixed to and extending radially from the shaft 32.

Figure 5:
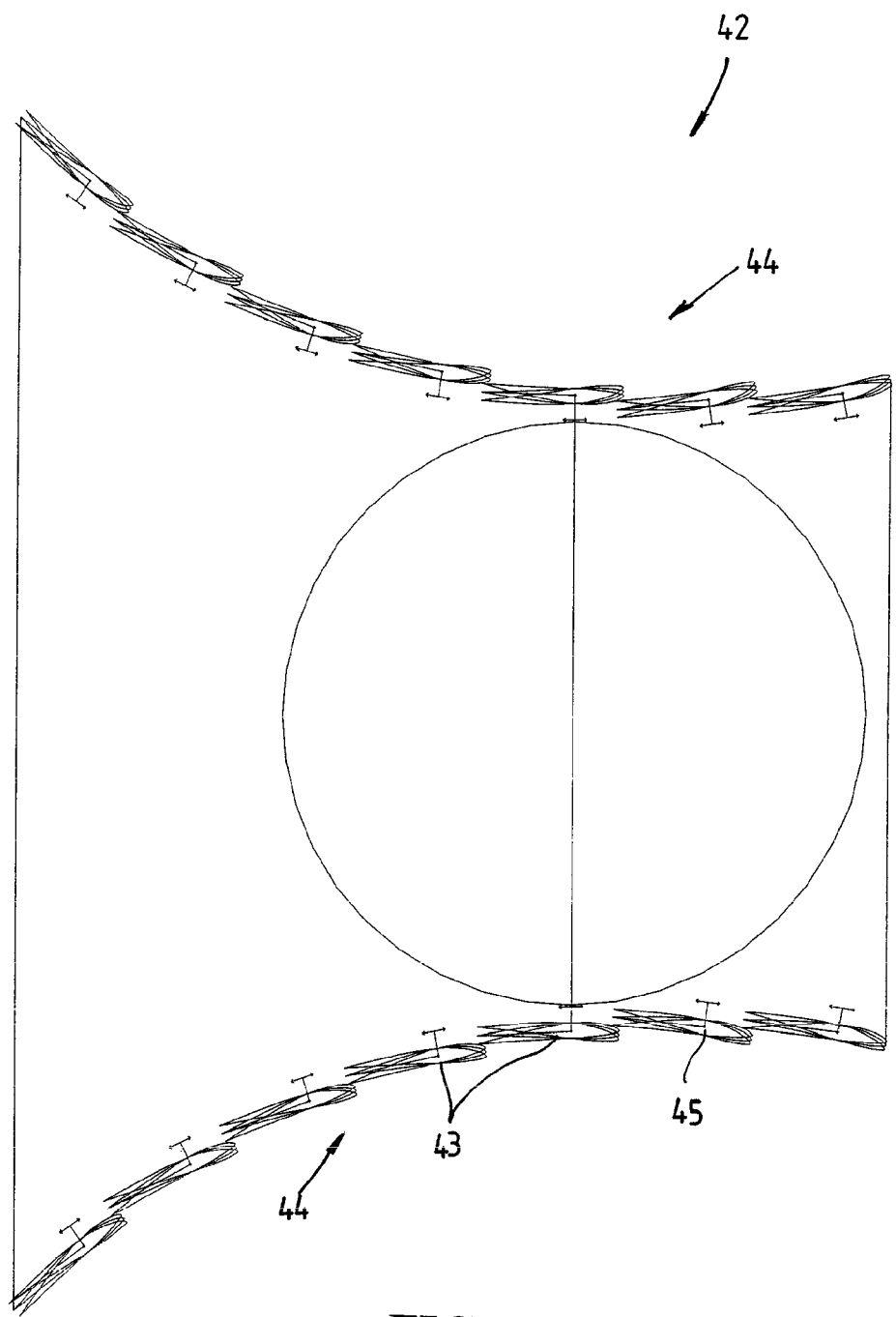
FIG. 5 illustrates schematically a cross sectional view similar to FIG. 2 showing a diffuser with adjustable side wall members.
Figure 6:
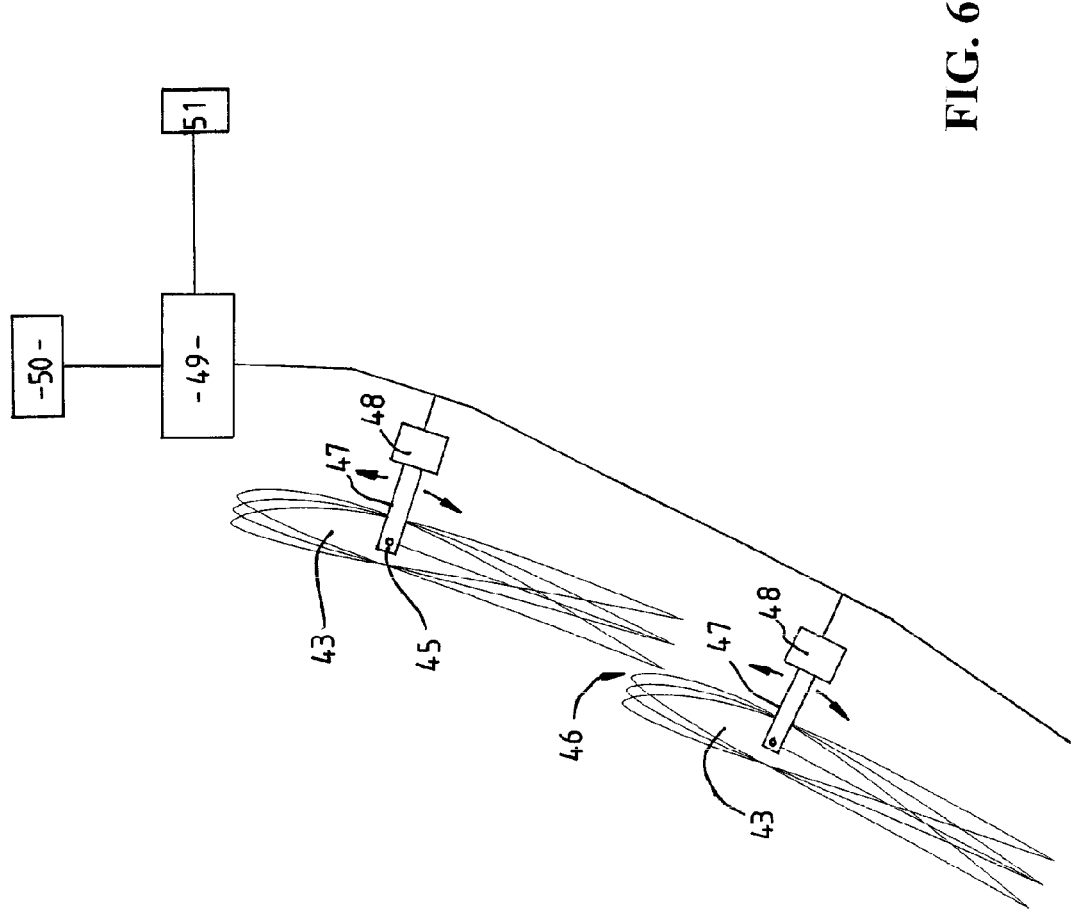
FIG. 6 is an enlarged view showing schematically an arrangement for adjusting the aerofoil section members of the side wall members.

Referring now to FIGS. 5 and 6, there is illustrated a modified diffuser 42 which is similar to the diffuser 11 and as before includes a series of aerofoil section members 43 which define opposite side walls 44 of the diffuser 42. The members 43 in this case however are mounted for rotation about longitudinally extending axes 45 which extend parallel to the leading edges of the members 43. Rotation of the members 43 permits adjustment of the size of the gap 46 between the trailing edge of one member 43 and the leading end of the adjacent member 43.

Adjustment of the rotational position of the members 43 can be effected by means of radial arms 47 fixed to the members 43 at or adjacent their pivot axes 45. The arms are coupled to servomotors 48 which can be actuated to effect movement of the arms 47 in opposite directions as illustrated by the arrows in FIG. 6 and thus cause opposite pivotal movement of the members 43. A programmable controller 49 is connected to the servomotors 48 to enable simultaneous actuation of the servomotors 48 and thus simultaneous pivotal movement of the members 44 in opposite directions to thereby simultaneously adjust the width of the gap 46 between the members 43. The controller 49 is also connected to an output sensor 50 which provides an indication of the power output of a prime mover such as a turbine 20 as previously described positioned in the diffuser 42. The controller 49 may also be connected to a fluid flow sensor 51 which senses the velocity of fluid in which the diffuser 42 is submerged or in the velocity of fluid in the diffuser flow passage.

The controller 49 is thus capable of adjusting the pivotal position of the members 44 and thus the width of the gaps 46 between the members 43 in accordance with sensed output of the prime mover to achieve optimal operation of the energy extraction apparatus. The controller 49 is programmable so that optimum operational positions of the members 44 relative to sensed flow can be programmed into the controller 49 in accordance with flow in the diffuser flow passage as sensed by the sensor 51.

Figure 7:
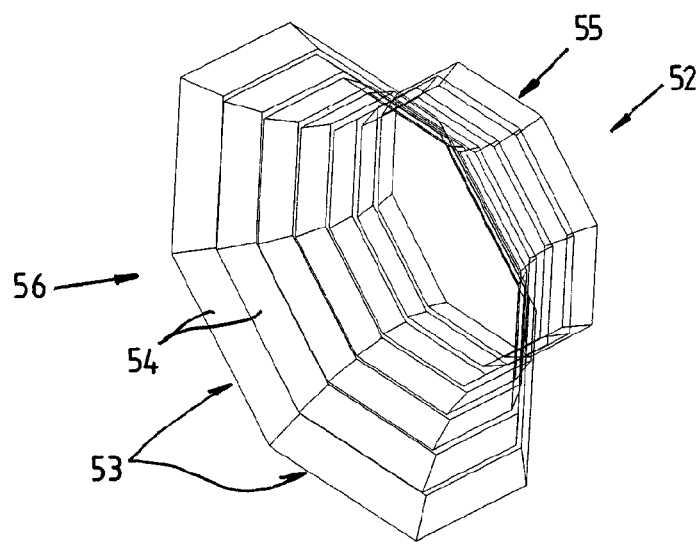
FIGS. 7 to 9 illustrate in perspective, side and end views an alternative diffuser according to the invention.
Figure 8:
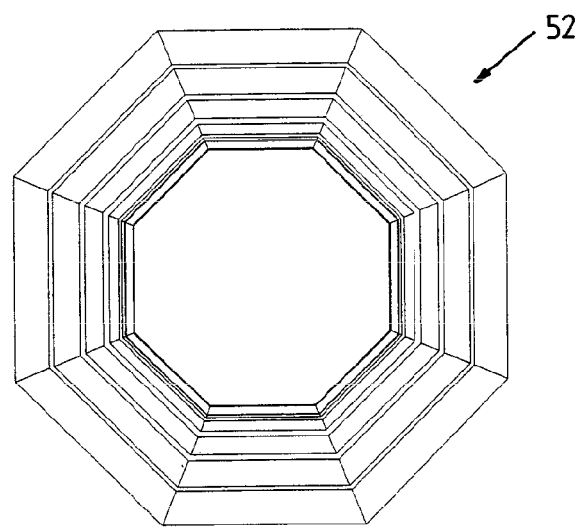
Figure 9:
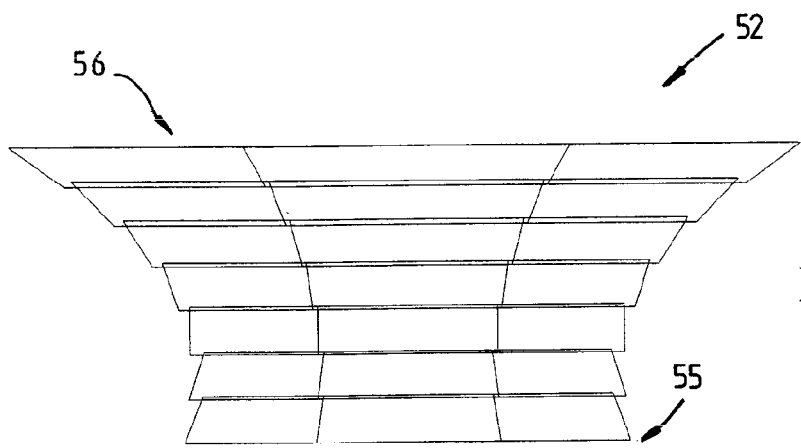

The diffusers described with reference to FIGS. 1 to 6 have flow passages which are substantially rectangular in cross section. The diffusers however may define flow passages of any cross section. Thus as shown in FIGS. 7 to 9, a diffuser 52 of octagonal cross section is illustrated and thus having eight sides 53 each defined a series of aerofoil section wall member 54 extending from the leading inlet end 55 to the outlet end 56 of the diffuser 52. In sectional view, each side 53 has a configuration which is the same as one half of the diffuser of FIG. 2.

Figure 10:
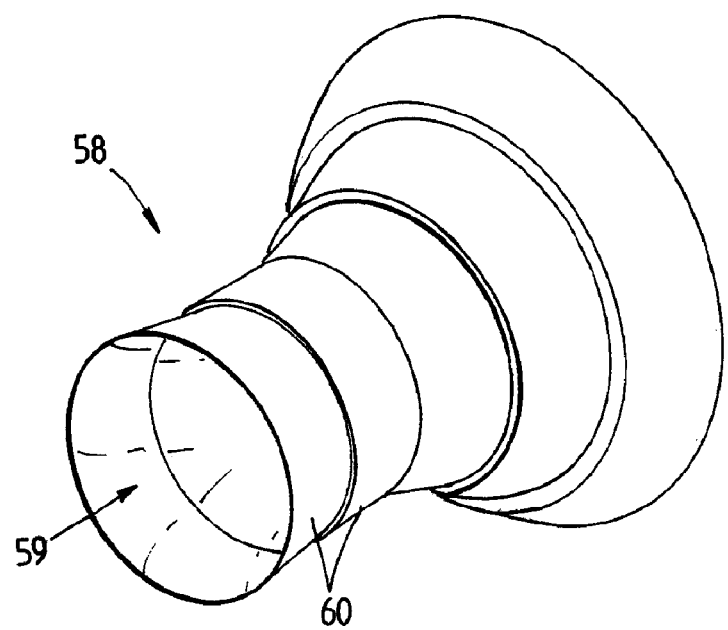
FIG. 10 illustrates in perspective view yet a further diffuser according to the invention.
Figure 11:
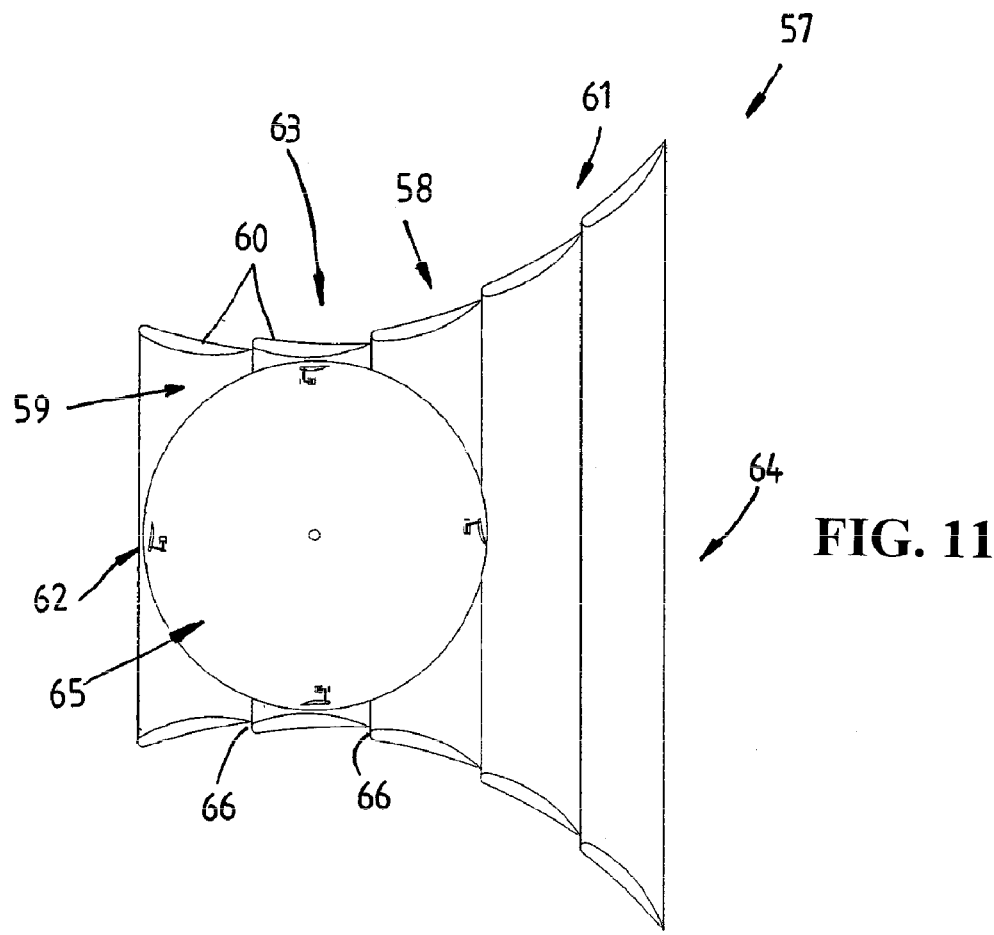
FIG. 11 is a cross section of the diffuser of FIG. 10 carrying a turbine.

Referring now to FIGS. 10 and 11 there is illustrated an alternative energy extraction apparatus 57 according to another embodiment of the invention having a diffuser 58 which defines a flow passage 59 of circular cross section. The diffuser 58 is comprised of a plurality of annular members 60 which defines a side wall 61 of the diffuser 58. The annular members 60 are of an asymmetrical aerofoil cross section and are arranged such that the flow passage 59 decreases in cross section from the inlet 62 to a constriction 63 and then increases in cross section to the outlet 64. As before a cross flow turbine 65 of similar configuration to that described previously is arranged within the constriction 63. Further as before, gaps 66 are provided between the leading and trailing ends of adjacent annular members 60 to allow introduction of fluid flow from outside the diffuser 58 and into the flow passage 59.

The aerofoil section members of the diffusers of in the embodiments of FIGS. 7 to 11 may also be adjusted to vary the size of the gaps between adjacent aerofoil section members to achieve optimum output of the prime mover located within the diffuser.

The aerofoil section members of the diffusers may be in various configurations other than that described and in varying numbers. In the embodiments illustrated the diffusers include five aerofoil section members however the diffusers may include any number of aerofoil section members. The aerofoil section members are typically of constant cross section throughout their length but may be of different aspect ratios. The aerofoil section members in the described diffusers are substantially identical in cross section however respective aerofoil section members in a diffuser may be of different cross sections. The aerofoil section members in a diffuser additionally or alternatively may have different aspect ratios.

The diffusers described above typically are constructed of metal such as aluminium but may be constructed of other materials such as glass reinforced plastics or combinations of materials. Similarly the components of the turbine may be constructed of plastics, glass reinforced plastics or other materials or combinations of materials.

The terms "comprising" or "comprises" or derivatives thereof as used throughout the specification and claims are taken to specify the presence of the stated features, integers and components referred to but not preclude the presence or addition of one or more other feature/s, integer/s, components or group thereof.

It will of course be realised that the above has been given only by way of illustrative example of the invention and that all such modifications and variations thereto as would be apparent to persons skilled in the art are deemed to fall within the broad scope and ambit of the invention as defined in the appended claims.

The invention claimed is:

1. A diffuser for use in apparatus for extracting energy from a flow of liquid, said diffuser comprising a flow passage having an inlet and an outlet and a side wall or walls between said inlet and said outlet, said flow passage having a decreasing cross sectional area inwardly from the inlet to a constricted region between the inlet and the outlet and having an increasing cross sectional area rearwardly and away from the constricted region towards the outlet, said side wall or walls being defined by a plurality of members of an aerofoil cross-section arranged in series between said inlet and said outlet such that other than at the inlet and outlet, the trailing portion of one aerofoil member is adjacent the leading portion of the immediately adjacent trailing aerofoil member and defines a gap or slot therewith whereby a plurality of gaps or slots are provided serially from said inlet to said outlet through which fluid from outside of said diffuser can pass into said flow passage.

2. A diffuser as claimed in claim 1, wherein at least one said aerofoil member is forwardly of said constricted region relative to said inlet.

3. A diffuser as claimed in claim 1, further including support means for rotatably supporting said diffuser whereby said diffuser may adjust to the direction of the flow of fluid.

4. A diffuser as claimed in claim 1, wherein said aerofoil members are arranged along a parabolic curve between the inlet and outlet.

5. A diffuser as claimed in claim 1, wherein said flow passage is of a substantially rectangular cross section, said diffuser having a pair of opposite spaced apart planar walls and a pair of opposite side walls defined by said aerofoil members.

6. A diffuser as claimed in claim 5, wherein said spaced apart planar walls comprise upper and lower walls and wherein said aerofoil members are oriented such that the leading and trailing ends of the aerofoil members are substantially vertical and extend between the upper and lower walls.

7. A diffuser as claimed in claim 1, wherein said flow passage is substantially circular in cross section and wherein said members comprise annular members of aerofoil cross section.

8. A diffuser as claimed in claim 1, wherein said flow passage is of multi-sided cross section wherein said flow passage is defined by a plurality of said aerofoil members which are angled to each other.

9. A diffuser as claimed in claim 1, wherein respective said aerofoil members from the constricted region rearwardly are angled at an increasing angle to the longitudinal axis of the diffuser.

10. A diffuser as claimed in claim 1, wherein at the leading end of the diffuser adjacent said inlet, the aerofoil members of the side walls are angled outwardly from the constricted region at 10 to 12 degrees to the longitudinal axis of the diffuser.

11. A diffuser as claimed in claim 1, wherein at the trailing end of the diffuser adjacent said outlet, the aerofoil members of the side walls are angled outwardly from the constricted region at 40 to 45 degrees to the longitudinal axis of the diffuser.

12. A diffuser as claimed in claim 1, wherein the aerofoil members comprise asymmetric aerofoil members.

13. A diffuser as claimed in claim 1, and including means for adjusting the aerofoil members to adjust the gap between the aerofoil section members.

14. A diffuser as claimed in claim 13, wherein said aerofoil members are mounted for pivotal movement about their longitudinal axes and further including means for adjusting the pivotal position of the members.

15. A method of generating energy, the method comprising the steps of providing a diffuser in a naturally occurring fluid flow, said diffuser comprising a flow passage having an inlet and an outlet and a side wall or walls between said inlet and said outlet, said side wall or walls being defined by a plurality of members of an aerofoil cross-section arranged in series between said inlet and said outlet and there being a gap or slot between adjacent said members whereby a plurality of gaps or slots are provided serially from said inlet to said outlet through which fluid may pass from outside of said diffuser into said flow passage, and said flow passage having a constricted region between said inlet and said outlet, and driving an energy take-off means with a prime mover positioned in the constricted region, the prime mover being configured to move in response to the flow of fluid through the constricted region.

16. An apparatus for generating energy comprising a diffuser defining a flow passage having an inlet and an outlet and a side wall or walls between said inlet and said outlet, said side wall or walls being defined by a plurality of members of an aerofoil cross-section arranged in series between said inlet and said outlet such that other than at the inlet and outlet, the trailing portion of one aerofoil member being adjacent the leading portion of the immediately adjacent trailing aerofoil member to define a gap or slot therewith whereby a plurality of gaps or slots are provided serially from said inlet to said outlet through which fluid may pass from outside of said diffuser into said flow passage, said flow passage having a constricted region between said inlet and outlet, and a prime mover positioned in the constricted region to drive an energy take-off means, the prime mover being configured to move in response to the flow of fluid through the constricted region.

17. Apparatus as claimed in claim 16, wherein said prime mover comprises a turbine having a rotatably mounted shaft and blades supported on or to the shaft, said blades being spaced radially from, and extending parallel to, the shaft and being of an aerofoil cross section, said blades being mounted so as to be capable of limited pivotal movement about their longitudinal axes.

18. Apparatus as claimed in claim 17, further comprising damping means to damp pivoting movement of the blades.

19. Apparatus as claimed in claim 18, wherein said damping means comprises an arm fixed to at least one blade for pivotal movement therewith, and a hydraulic piston and cylinder coupled to said arm.

20. Apparatus as claimed in claim 19, wherein said cylinder includes an opening to allow limited flow of fluid to and from the cylinder upon movement of the piston therein in opposite directions.

21. Apparatus as claimed in claim 19, further including stop means in the path of movement of the arm to limit pivotal movement of the arm and said at least one blade in a first direction, said damping means limiting the pivotal movement of the arm and said at least one blade in the opposite direction.

22. Apparatus as claimed in claim 16, further including means for sensing the output of said prime mover and means for adjusting said aerofoil section members to vary the size of said gaps between said aerofoil section members in accordance with the sensed output.

* * * * *

UNITED STATES PATENT AND TRADEMARK OFFICE
CERTIFICATE OF CORRECTION

PATENT NO. : 7,713,020 B2
APPLICATION NO. : 10/564490
DATED : May 11, 2010
INVENTOR(S) : Davidson et al.

It is certified that error appears in the above-identified patent and that said Letters Patent is hereby corrected as shown below:

Title Page, after (65) Prior Publication Data information, foreign priority information should appear as follows:

-- (30) Foreign Application Priority Data
July 11, 2003   (AU) .................................... 2003903645 --

Signed and Sealed this

Twenty-second Day of June, 2010

David J. Kappos
*Director of the United States Patent and Trademark Office*